(12) United States Patent
Li et al.

(10) Patent No.: US 12,399,045 B2
(45) Date of Patent: Aug. 26, 2025

(54) SWIRLER-TYPE GAS-LIQUID TWO-PHASE FLOW METERING DEVICE AND METHOD

(71) Applicant: JIANGSU FORGED PIPE FITTINGS CO., LTD, Yancheng (CN)

(72) Inventors: Naiming Li, Yancheng (CN); Zhongbiao Cheng, Yancheng (CN); Feng Ji, Yancheng (CN); Dengquan Yuan, Yancheng (CN)

(73) Assignee: JIANGSU FORGED PIPE FITTINGS CO., LTD, Yancheng (CN)

( * ) Notice: Subject to any disclaimer, the term of this patent is extended or adjusted under 35 U.S.C. 154(b) by 317 days.

(21) Appl. No.: 18/085,610

(22) Filed: Dec. 21, 2022

(65) Prior Publication Data

US 2024/0125632 A1 Apr. 18, 2024

(30) Foreign Application Priority Data

Oct. 13, 2022 (CN) .......................... 202211252265.1

(51) Int. Cl.
*G01F 1/325* (2022.01)
(52) U.S. Cl.
CPC ................ *G01F 1/3287* (2022.01)
(58) Field of Classification Search
CPC .................................................. G01F 1/3287
USPC ...................................................... 73/861.24
See application file for complete search history.

(56) References Cited

U.S. PATENT DOCUMENTS

| 3,256,737 A | * | 6/1966 | Sipin | G01F 1/115 |
| | | | | 73/861.83 |
| 4,408,498 A | * | 10/1983 | Heath | G01F 1/10 |
| | | | | 73/861.89 |
| 4,526,584 A | * | 7/1985 | Funk | C10L 1/322 |
| | | | | 44/280 |
| 4,884,894 A | * | 12/1989 | Hashimoto | B01F 25/434 |
| | | | | 366/338 |
| 5,575,559 A | * | 11/1996 | Roll | B01F 27/27 |
| | | | | 366/307 |

(Continued)

FOREIGN PATENT DOCUMENTS

| CN | 209612410 U | 11/2019 |
| CN | 210875837 U | 6/2020 |
| CN | 212215928 U | 12/2020 |

*Primary Examiner* — Peter J Macchiarolo
*Assistant Examiner* — Rodney T Frank

(57) ABSTRACT

The disclosure discloses a swirler-type gas-liquid two-phase flow metering device, mainly including a swirler, a capacitance probe module, a hot-wire probe module, a hub and a data acquisition computer. A flow measurement method using the gas-liquid two-phase flow metering device includes: adjusting, by the swirler, flow patterns of an incoming gas-liquid two-phase flow into a uniform annular flow, measuring gas and liquid phase distribution by the capacitance probe module, and measuring gas and liquid phase flow velocity distribution by the hot-wire probe, and volumetric flow rates of gas, thereby obtaining liquid phases according to flow areas and average flow velocities of the gas and liquid phases. Compared with the existing multiphase flowmeter, the gas-liquid two-phase flow metering device of the disclosure has the advantages of small size, compact structure, small resistance loss, wide measurement range, high measurement accuracy, etc.

3 Claims, 5 Drawing Sheets

(56) References Cited

U.S. PATENT DOCUMENTS

| | | | | |
|---|---|---|---|---|
| 5,916,491 A * | 6/1999 | Hills | ................ | B01F 23/23341 |
| | | | | 261/120 |
| 2007/0240498 A1 * | 10/2007 | Scott | ................ | G01N 33/2847 |
| | | | | 73/61.43 |
| 2010/0303591 A1 * | 12/2010 | Mongstad | ........... | B65B 69/0033 |
| | | | | 414/412 |
| 2013/0201316 A1 * | 8/2013 | Binder | .................... | H04L 67/12 |
| | | | | 701/2 |
| 2018/0348035 A1 * | 12/2018 | Huang | .................... | G01F 23/26 |
| 2020/0041397 A1 * | 2/2020 | Paolinelli | ................ | G01N 27/02 |

* cited by examiner

SWIRLER-TYPE GAS-LIQUID TWO-PHASE FLOW METERING DEVICE AND METHOD

CROSS-REFERENCE TO RELATED APPLICATIONS

The application claims priority to Chinese patent application No. 202211252265.1, filed on Oct. 13, 2022, the entire contents of which are incorporated herein by reference.

TECHNICAL FIELD

The disclosure belongs to the field of flow measurement, and particularly relates to a device and method for measuring flow rates of a gas-liquid two-phase flow in a pipe.

BACKGROUND

Gas-liquid two-phase flows widely exists in many industrial fields such as petroleum, chemical engineering, nuclear energy, etc. Flow metering of a two-phase fluid in a system with two-phase flow is generally unavoidable, and it is also a problem that has not been well solved. Multiphase flow measurement methods are generally divided into 3 types according to whether the multiphase flow is separated and the degree of separation: a complete separation method, a non-separation method, and an extracting and separating method.

In the complete separation method, a gas-liquid mixture is separated by separation equipment into single-phase gas and single-phase liquid, which are then measured by common single-phase flowmeters, so that two-phase flow measurement is converted into single-phase flow measurement. The complete separation method has the advantages of high operation reliability, high measurement accuracy and wide measurement range, and is insusceptible to changes in the flow pattern of the gas-liquid two-phase flow. But its biggest disadvantage is that the separation equipment is bulky and expensive, and it is required to establish special metering stations and test pipelines, which greatly increases the development cost of flowmeters.

In the non-separation method, a measuring instrument is directly placed in a two-phase fluid for measurement. The paper "Study on Venturi Nozzle for Gas Liquid Two Phase Flow Metering" published in Journal of Harbin Institute of Technology (New Series) (2012, Vol. 19. No. 1) describes a method for simultaneously measuring of flow rates of gas and liquid phases in a gas-liquid two-phase mixture using a single venturi nozzle. This method has the disadvantage that there is a big pressure drop and a high energy loss when the gas-liquid two-phase flow passes through the throttle nozzle. In addition, compared with the single-phase flow, a distinctive feature of the two-phase flow is that the flow fluctuates strongly. As the flow rates of the gas and liquid phases change constantly, the gas-liquid two-phase flow may take different distribution forms on the cross section of the pipe (flow patterns), such as stratified flow, wave flow, annular flow, plug flow, etc. Therefore, the instrument directly operating in the two-phase fluid used in the non-separation method is greatly affected by the fluctuation of the two-phase flow, thus having low measurement accuracy and small measurement range.

Chinese patent 98113068.2 discloses an extracting and separating type two-phase fluid measuring method. Its principle is that: a two-phase fluid to be measured is divided into two parts when flowing through a distributor: a part of the two-phase fluid, which is called the main fluid, continues to flow downstream along the original channel, and this loop is called the main flow loop; and the other part of the two-phase fluid, which is called an extracted fluid, enters a separator, and this branch is called the extracted fluid loop. After the extracted fluid is separated by the separator, the gas and the liquid are respectively measured by a gas flowmeter and a liquid flowmeter, and finally rejoin the main fluid. The gas-phase flow rate and the liquid-phase flow rate of the two-phase fluid to be measured are calculated according to their proportional relationship with the gas-phase flow rate/liquid-phase flow rate in the extracted fluid. How to ensure that the sampled fluid and the fluid to be measured have exactly the same phase fraction and a stable proportional relationship is the key to the success of the method. However, phase separation often occurs in the sampling process of the gas-liquid two-phase flow, leading to increased measurement errors.

In order to overcome the defects in the prior art, the disclosure provides a novel multiphase flow rate metering device and method. A gas-liquid two-phase flow is separated in a pipe by a swirler to form an annular liquid film region and a central gas region, gas and liquid phase distribution is measured by a capacitance probe, and gas and liquid flow velocity distribution is measured by a hot-wire probe, thereby obtaining flow rates of gas and liquid phases. Compared with the existing multiphase flow rate metering method, the disclosure has the advantages of small size, compact structure, small resistance loss, wide measurement range, high measurement accuracy, etc.

SUMMARY

The disclosure relates to a swirler-type gas-liquid two-phase flow metering device, mainly including a swirler, a capacitance probe module, a hot-wire probe module, a hub and a data acquisition computer. The swirler, the capacitance probe module and the hot-wire probe module are sequentially arranged inside a test pipe along a flow direction of a gas-liquid two-phase fluid, the capacitance probe module and the hot-wire probe module are respectively connected to the hub through data lines, and the hub is connected to the data acquisition computer through a data line. An upstream end of the test pipe is provided with an upstream flange, a downstream end of the test pipe is provided with a downstream flange, and the upstream flange and the downstream flange are respectively connected upstream and downstream of a to-be-tested pipe gas-liquid two-phase flow pipe.

The swirler includes a central shaft and a helical blade, and an outer edge of the helical blade is kept attached to an inner wall of the test pipe.

The capacitance probe module includes a single-wire capacitance probe and a single metal wire that are arranged in parallel and both run through a center of the test pipe, and a distance between the single-wire capacitance probe and the metal wire is 2 mm to 5 mm. The single-wire capacitance probe has a metal core at a center and an insulating layer as an outer layer.

The hot-wire probe module includes a plurality of hot-wire probes, the probes are arranged sequentially along the flow direction at an interval of 2 to 3 mm, and a head of each probe sequentially lengthens from the wall of the pipe to the center of the pipe along a pipe diameter direction with an amplitude of $1/10$ to $1/5$ of a radius of the pipe.

The capacitance probe module is about 1 to 1.5 times the pipe diameter from a tail end of the helical blade, and the hot-wire probe module is about 0.3 to 0.6 time the pipe diameter from the capacitance probe module.

The disclosure further relates to a swirler-type gas-liquid two-phase flow metering device, mainly including the following steps:
   (a) measuring a length of liquid film L in contact with a capacitance probe, thereby calculating a thickness of liquid film of an annular flow $L_f=0.5L$;
   (b) calculating, based on the thickness of liquid film $L_f$, a gas flow area according to a formula $$A_G = \frac{\pi}{4}(D - 2L_f)^2$$

and a liquid-phase flow area according to a formula $A_L=\pi(D-L_f)L_f$;
   (c) determining whether a gas-phase flow velocity or a liquid-phase flow velocity is measured at a corresponding measuring point according to a position of a hot-wire probe and the measured thickness of liquid film, thereby obtaining a gas-phase average flow velocity $V_G$ and a liquid-phase average flow velocity $V_L$; and
   (d) calculating a gas-phase volumetric flow rate according to a formula $Q_G=A_G V_G$, and calculating a liquid-phase volumetric flow rate according to a formula $Q_L=A_L V_L$.

Compared with the prior art, the disclosure has the following beneficial effects:
   (1) Under the action of the swirler, different flow patterns are converted into the annular flow having the uniformly distributed liquid film, thereby eliminating the influence of the fluctuating flow patterns of the gas-liquid two-phase flow on the measurement.
   (2) The gas-liquid mixture is separated into a liquid film region and a central gas region in the pipe, which converts the measurement of the gas-liquid two-phase flow into the measurement of the single-phase flows. Therefore, the measurement accuracy is high.
   (3) No throttling device is used, so the resistance loss is small.
   (4) There are no moving parts, so there is basically no need of maintenance or calibration. Therefore, the disclosure has the advantages of simple composition, low production and operating costs, convenient operation, etc.

In the figures: 1—test pipe, 2—upstream flange, 3—downstream flange, 4—swirler, 5—capacitance probe module, 6—hot-wire probe module, 7—hub, 8—data acquisition computer, 9—helical blade, 10—central shaft, 11—single-wire capacitance probe, 12—single metal wire, 13—metal core, 14—insulating layer, 15—hot-wire probe, 16—fork prong, 17—fork stem.

DETAILED DESCRIPTION OF THE EMBODIMENTS

The technical solutions in the examples of the disclosure will be clearly and completely described below with reference to the accompanying drawings in the examples of the disclosure. It is apparent that the described examples are only a part of the examples, rather than all of the examples of the disclosure. All other examples obtained by those of ordinary skill in the art based on the examples of the disclosure without creative work are within the protection scope of the disclosure.

Figure 1:
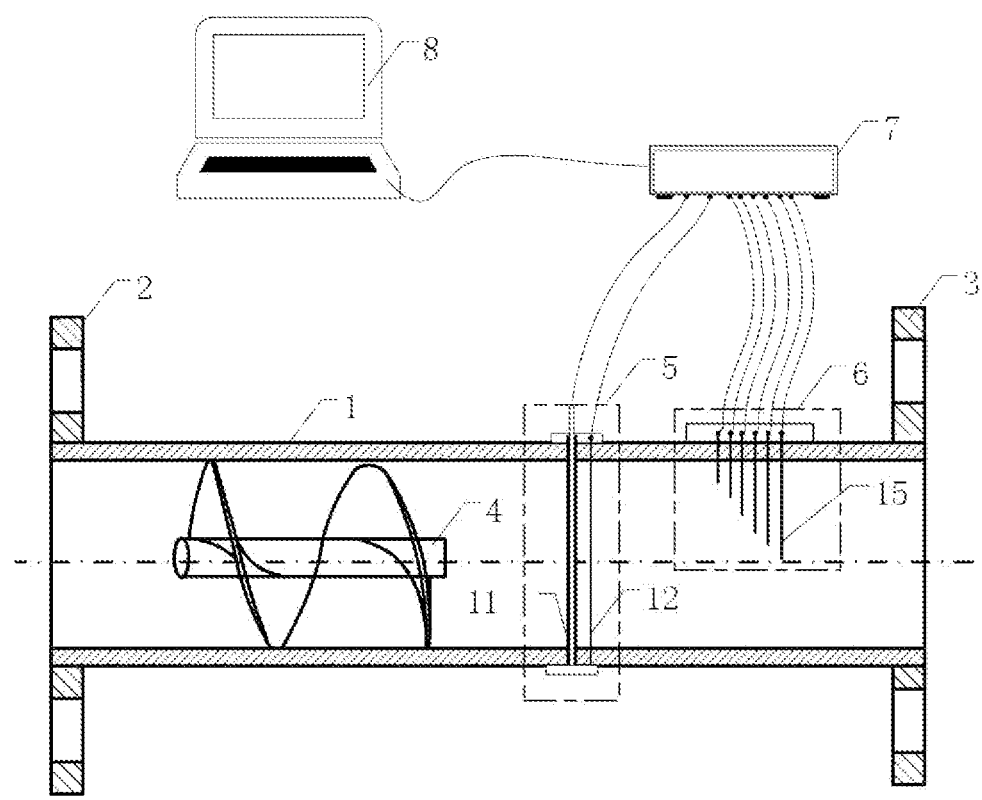
FIG. 1 is a schematic view showing the composition of the disclosure.

As shown in FIG. 1, a swirler-type gas-liquid two-phase flow metering device mainly includes a swirler 4, a capacitance probe module 5, a hot-wire probe module 6, a hub 7 and a data acquisition computer 8. The swirler 4, the capacitance probe module 5 and the hot-wire probe module 6 are sequentially arranged inside a test pipe 1 along a flow direction of a gas-liquid two-phase fluid, the capacitance probe module 5 and the hot-wire probe module 6 are respectively connected to the hub 7 through data lines, and the hub 7 is connected to the data acquisition computer 8 through a data line. An upstream end of the test pipe 1 is provided with an upstream flange 2, a downstream end of the test pipe 1 is provided with a downstream flange 3, and the upstream flange and the downstream flange are respectively connected upstream and downstream of a to-be-tested pipe gas-liquid two-phase flow pipe.

Figure 2:
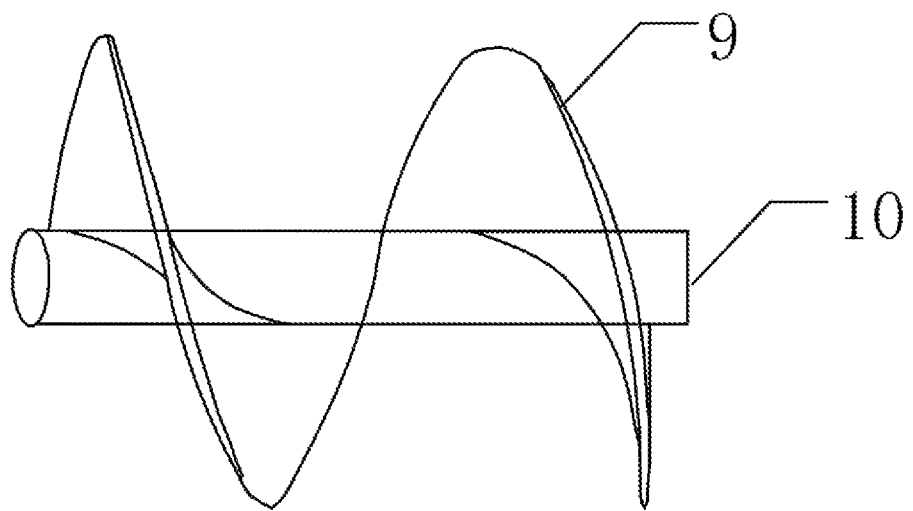
FIG. 2 is a schematic structural view of a swirler.

As shown in FIG. 2, the swirler 4 includes a central shaft 10 and a helical blade 9, and an outer edge of the helical blade 9 is kept attached to an inner wall of the test pipe 1.

Figure 3:
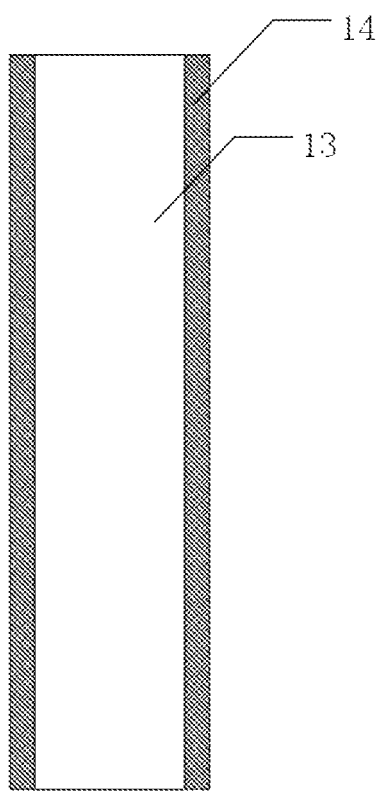
FIG. 3 is a schematic view of a single-wire capacitance probe.
Figure 4:
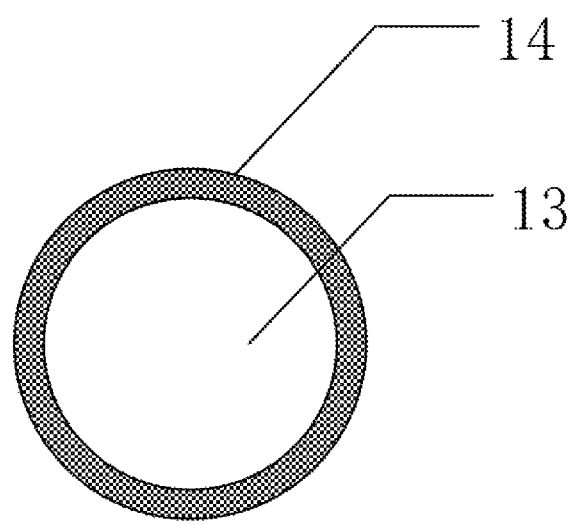
FIG. 4 is a schematic sectional view of the single-wire capacitance probe.

As shown in FIG. 1, the capacitance probe module 5 includes a single-wire capacitance probe 11 and a single metal wire 12 that are arranged in parallel and both run through a center of the test pipe 1, and a distance between the single-wire capacitance probe 11 and the metal wire 12 is preferably 2 mm to 5 mm. As shown in FIG. 3 and FIG. 4, the single-wire capacitance probe 11 has a metal core 13 at a center, and an insulating layer 14 is coated outside the metal core 13.

Figure 5:
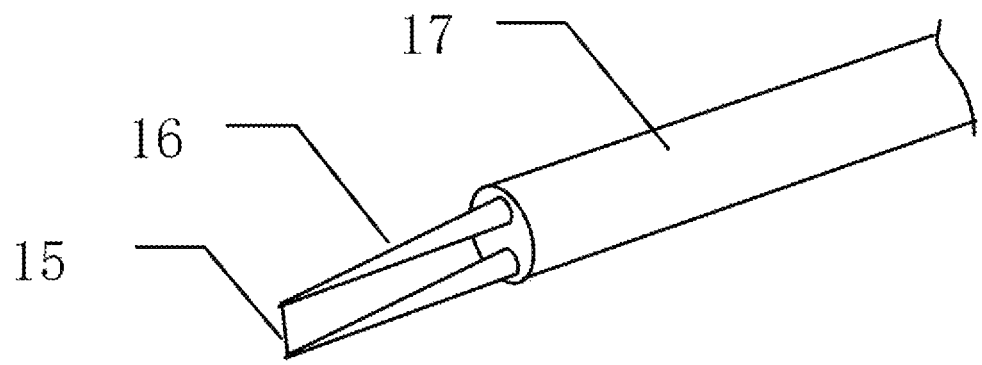
FIG. 5 is a schematic structural view of a hot-wire probe.

As shown in FIG. 5, the hot-wire probe module 6 includes a plurality of hot-wire probes 15, the hot-wire probes 15 are arranged sequentially along the flow direction at a horizontal interval of 2 mm to 3 mm, and a head of each probe sequentially lengthens from the wall of the pipe along a pipe diameter direction with an amplitude of $\frac{1}{10}$ to $\frac{1}{5}$ of a radius of the pipe.

As shown in FIG. 1, the capacitance probe module 5 is about 1 to 1.5 times the pipe diameter from a tail end of the helical blade 9, and the hot-wire probe module 6 is about 0.3 to 0.6 time the diameter of the test pipe from the capacitance probe module 5.

The operating principle of the disclosure is described as follows:

As shown in FIG. 1 and FIG. 2, the swirler 4 is arranged inside the test pipe 1, the helical blade 9 is wound around the central shall 10 of the swirler 4, and the outer edge of the helical blade 9 is kept attached to the inner wall of the test pipe 1. The gas-liquid two-phase flow, when passing through the swirler 4, is forced to flow along a helical flow channel formed by the helical blade 9, the inner wall of the test pipe 1 and the central shaft 10, thus making the gas-liquid two-phase flow swirl. Since the density of the liquid phase is much greater than the density of the gas phase, the liquid is thrown to the inner wall of the pipe under the action of centrifugal force generated by the swirling so as to flow against the wall of the pipe in the form of the liquid film, and the gas flows at the center of the pipe.

As shown in FIG. 3, the single-wire capacitance probe 11 is a double-layer structure, having the metal core 13 at the center and the insulating layer 14 uniformly coated outside. When the single-wire capacitance probe 11 contacts a liquid with certain conductivity, the conductive liquid and the metal core 13 form a cylindrical capacitor, and the insulating layer 14 serves as a dielectric of the capacitor. The capacitance of the cylindrical capacitor may be calculated according the following formula:

$$C = \frac{2\pi\varepsilon L}{\ln\left(\frac{d+2\delta}{d}\right)}$$

where L is the thickness of liquid film in contact with the probe; d is the diameter of the metal core 13; δ is the thickness of the insulating layer 14; and ε is the dielectric constant of the insulating layer 14.

As can be seen from the formula, d, δ and ε are all constants, so the thickness of liquid film is linearly related to the capacitance of the probe. In addition, ε, which is the dielectric constant of the insulating layer 14, is related only to the material of the insulating layer, but not to the properties of the fluid, so the measured value is only dependent on the thickness of liquid film in contact with the capacitance probe 11, but independent of the fluctuations of parameters of the fluid, such as salt content, temperature and pressure.

As shown in FIG. 1, the capacitance probe 11 runs through the cross section of the whole test pipe. Since the inner wall of the pipe is covered with the liquid film, the measured length of liquid film is actually twice the thickness of liquid film, so the actual thickness of liquid film Lf of the pipe is 0.5 time the measured length of liquid film L.

As shown in FIG. 5, the hot-wire probe 15 includes a hot-wire probe head, fork prongs 16 and a fork stem 17. The hot-wire probe head is made of a thin metal wire having a length preferably ranging from 0.5 to 1 mm and a diameter ranging from 1 to 10 μm. The thin metal wire is made of a platinum, tungsten or platinum-rhodium alloy. Two ends of the metal wire are welded to tips of the two stainless steel fork prongs 16. Its operating principle is: An electrically heated thin metal wire (also referred to as hot wire) is arranged in the gas phase or liquid phase. Heat dissipation of the hot wire in the gas flow is related to the flow velocity. The heat dissipation leads to a change in the temperature of the hot wire, causing a change in the resistance. The flow velocity signal is converted into an electrical signal. Therefore, according to the theory of forced convection heat transfer, the velocity of the fluid at the detected position can be obtained by measuring the voltage of the hot wire.

The method of the disclosure may specifically include the following steps:
(a) measuring a length of liquid film L in contact with a capacitance probe, thereby calculating a thickness of liquid film of an annular flow $L_f=0.5L$;
(b) calculating, based on the thickness of liquid film $L_f$, a gas flow area according to a formula $$A_G = \frac{\pi}{4}(D-2L_f)^2$$

and a liquid-phase flow area according to a formula $A_L=\pi(D-L_f)L_f$;

(c) determining whether a gas-phase flow velocity or a liquid-phase flow velocity is measured at a corresponding measuring point according to a position of a hot-wire probe and the measured thickness of liquid film, thereby obtaining a gas-phase average flow velocity $V_G$ and a liquid-phase average flow velocity $V_L$; and
(d) calculating a gas-phase volumetric flow rate according to a formula $Q_G=A_GV_G$, and calculating a liquid-phase volumetric flow rate according to a formula $Q_L=A_LV_L$.

It should be noted that the term "include", "comprise", or any other variant thereof is intended to cover a non-exclusive inclusion, such that a process, method, article or device that includes a series of elements includes not only those elements but also other elements not specifically listed, or elements that are inherent to the process, method, article or device. In the absence of further limitation, an element defined by the phrase "including a . . . " does not exclude the presence of the same element in the process, method, article or device including the element.

Although the examples of the disclosure have been shown and described, for those of ordinary skill in the art, it can be understood that various changes, modifications, substitutions and variations can be made to these examples without departing from the principle and spirit of the disclosure, and the scope of the disclosure is defined by the appended claims and their equivalents.

What is claimed is:

1. A swirler-type gas-liquid two-phase flow metering device, comprising a swirler, a capacitance probe module, a hot-wire probe module, a hub and a data acquisition computer; wherein the swirler, the capacitance probe module and the hot-wire probe module are sequentially arranged inside a test pipe along a flow direction of a gas-liquid two-phase fluid, the capacitance probe module and the hot-wire probe module are respectively connected to the hub through data lines, and the hub is connected to the data acquisition computer through a data line; and an upstream end of the test pipe is provided with an upstream flange, a downstream end of the test pipe is provided with a downstream flange, the upstream flange and the downstream flange are respectively connected upstream and downstream of a to-be-tested pipe gas-liquid two-phase flow pipe, the swirler comprises a central shaft and a helical blade, and an outer edge of the helical blade is kept attached to an inner wall of the test pipe, and wherein the capacitance probe module comprises a single-wire capacitance probe and a single metal wire that are arranged in parallel and both run through a center of the test pipe, and a distance between the single-wire capacitance probe and the metal wire is 2 mm to 5 mm; and the single-wire capacitance probe has a metal core at a center and an insulating layer as an outer layer.

2. The swirler-type gas-liquid two-phase flow metering device according to claim 1, wherein the hot-wire probe module comprises a plurality of hot-wire probes, the probes are arranged sequentially along the flow direction at an interval of 2 to 3 mm, and a head of each probe sequentially lengthens from the wall of the pipe to the center of the pipe along a pipe diameter direction with an amplitude of 1/10 to 1/5 of a radius of the pipe.

3. The swirler-type gas-liquid two-phase flow metering device according to claim 1, wherein the capacitance probe module is about 1 to 1.5 times the pipe diameter from a tail end of the helical blade, and the hot-wire probe module is about 0.3 to 0.6 time the pipe diameter from the capacitance probe module.

* * * * *